Aug. 23, 1955     A. J. PALLOTTA ET AL     2,715,795
MICROORGANISM CULTURE METHOD AND APPARATUS
Filed June 22, 1954
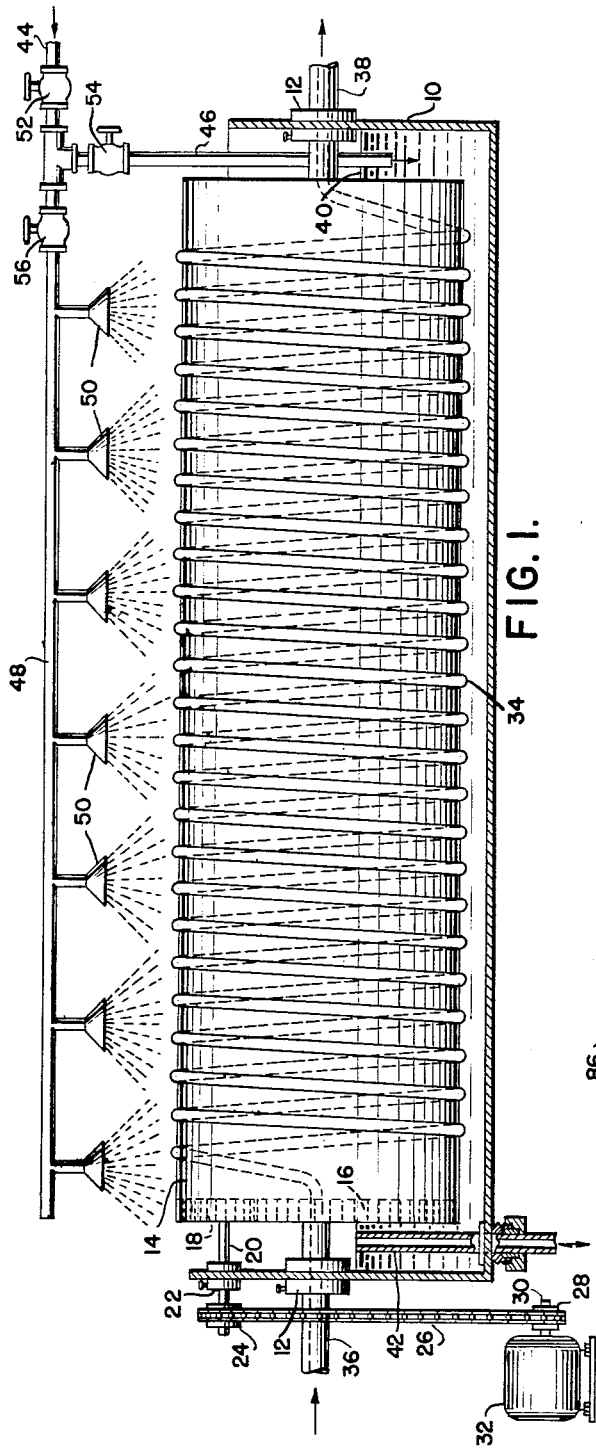
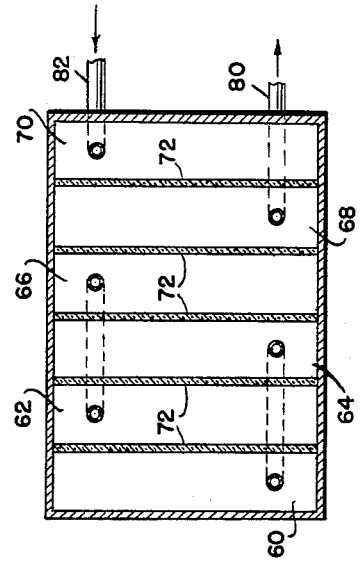
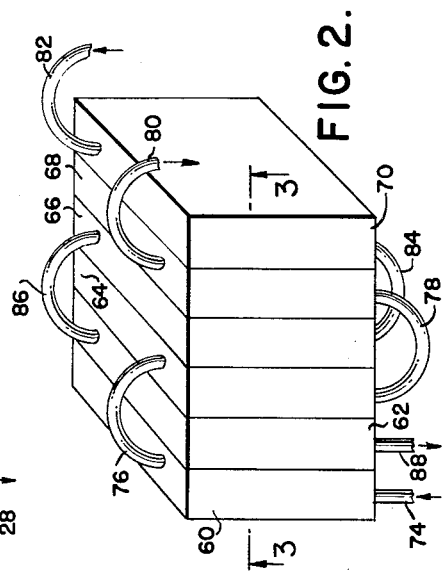
INVENTOR
Arthur J. Pallotta
Donald F. Bogdanski
Richard O. Thomas
BY Raymond W. Colton
ATTORNEY United States Patent Office 2,715,795
Patented Aug. 23, 1955

2,715,795

MICROORGANISM CULTURE METHOD AND APPARATUS

Arthur J. Pallotta, Donald F. Bogdanski, and Richard O. Thomas, Washington, D. C., assignors to Basic Research Corporation, Washington, D. C., a corporation of Delaware Application June 22, 1954, Serial No. 438,384

20 Claims. (Cl. 47—58)

This invention relates to methods and apparatus for the propagation of photosynthetic microorganisms employing the principle of dialysis.

Among the photosynthetic microorganisms contemplated are algae, including Chlorella, and *Chlorella pyrenoidosa* are among the more useful of these microorganisms to which the method and apparatus of the present invention have been applied thus far.

The general subject with which the present invention concerns itself is rather exhaustively treated in a publication of the Carnegie Institute of Washington, Publication 600, entitled "Algal Culture: From Laboratory to Pilot Plant," edited by John S. Burlew, published July 15, 1953. According to that publication, the conventional method and apparatus for the culture of such microorganisms contemplates the addition of nutrients to an aqueous bath containing the microorganisms as a batch operation based upon periodic analyses to determine which of the nutrients requires replacement and in what proportions. With such procedures, it is very difficult if not impossible to maintain conditions that will assure optimum growth of the microorganisms undergoing the culture.

By way of contrast, in accordance with the present invention, where the microorganism bath is separated from its nutrient bath by a dialyzing membrane, replacement of nutrients to the microorganism bath is effected on a continuous basis, facilitating the maintenance of the required nutrients and producing an optimum hydrogen ion concentration for the best growth conditions. Moreover, by the use of such a dialyzing membrane, removal of the toxic ingredients from the microorganism bath becomes automatic, thus again contributing to the attainment of nearly ideal conditions.

Of the commercially available relatively inexpensive materials adapting itself to the present invention, various forms of "cellophane" have produced excellent results. Such a mterial, in its regenerated cellulose form for example, is semi-permeable, excluding bacteria, algae and other high molecular weight materials yet permitting the passage of the nutrient bath ingredients such as those listed on page 94 of the Carnegie Institution of Washington publication already mentioned. This characteristic of semi-permeable or dialyzing membranes permits ordinary sewage to serve as the nutrient bath without endangering the sterility of the medium in which the microorganisms are carried. Another great advantage of the "cellophane" type of material is its light transmitting characteristic permitting the access of natural or artificial light to the microorganism bath for periods of duration and frequency to produce the optimum growth conditions.

The method of the present invention relates to the propagation of photosynthetic microorganisms comprising exposing an aqueous bath containing such microorganisms to one surface of a dialyzing membrane, exposing a nutrient bath for the microorganisms to an opposed surface of the membrane and exposing the microorganisms to light. It is preferable to agitate the bath containing the microorganisms during the operation but in any event, movement relative to the membrane is preferably imparted to one of the baths and eminently satisfactory results have been obtained in this connection by imparting the relative movement to the bath containing the microorganisms and at the same time advancing this bath along the surface of the membrane.

Highly desirable results have been achieved through the use of the membrane in tubular form and advancing one of the baths therethrough in a substantially helical path.

Under any conditions, the microorganisms in their bath are exposed to light and such exposure may be intermittent. The introduction of carbon dioxide into one or both of the baths has produced excellent results even where the introduction of atmospheric air containing only a small proportion of carbon dioxide is employed. The use of counterflow for the microorganism and nutrient baths has indicated further advantages. Although the method of the present invention is applicable to widely different types of photosynthetic microorganisms, its applicability to the green algae *Chlorella pyrenoidosa* promises startling results on a commercial scale.

The apparatus contemplated herein comprises a tubular dialyzing membrane having an inlet and an outlet for the passage of liquid and a receptacle receiving at least a portion of the membrane for its immersion in a second liquid. The membrane preferably assumes the form of a substantially helical tube and agitation means is preferably provided to produce relative movement between the membrane and receptacle.

A more complete understanding of the invention will follow from a more detailed description in conjunction with the accompanying drawing wherein:

Fig. 1 is a diagrammatic representation of apparatus adapted for the practicing of the present invention;

Fig. 2 is a fragmentary view depicting a modified form of tube; and

Fig. 3 is a sectional view taken along line 3—3 of Fig. 2.

With reference to the drawing, one form of apparatus productive of highly satisfactory results includes a tank or receptacle 10 providing journals 12 rotatably supporting a drum 14 carrying at one of its ends, an internal gear 16 in mesh with a spur gear 18 whose shaft 20 rotates in a journal 22 also carried by the wall of the tank 10, the outer end of the shaft 20 carrying a sprocket 24 driven by a chain 26 which is in turn driven by a sprocket 28 on the shaft 30 of a motor 32.

Helically wound about the drum or cylinder 14 is a tube 34 having light transmitting properties and being semi-permeable so as to constitute a dialyzing membrane permeable to the nutrient components required for the culture of such microorganisms as those contemplated herein and impermeable of course, to the microorganisms themselves. The inlet end of the "Cellophane" or other dialyzing membrane tube extends through one of the shafts 36 of the drum, the outlet end passing through a similar shaft 38, both of which shafts will be provided with rotary joints, not shown, to permit the introduction and discharge of the aqueous bath relative to the tube without leakage.

Assuming that the microorganism bath is introduced through the shaft 36, tube 34 and shaft 38, then the tank 10 will receive an aqueous bath containing the nutrient materials, depicted as having a level 40 determined by the adjusted position of an overflow pipe 42 penetrating a wall of the tank 10. The nutrient solution can be introduced by directing it into the tank by means of a supply pipe 44 and a tube 46 connected therewith and/or through a branch line 48 provided with spray heads 50.

By the manipulation of valves 52, 54 and 56 arranged in these lines respectively, the nutrient bath can be introduced through either or both of the branch lines. Where the spray heads are used, nutrient materials will be supplied to the dialyzing membranous tube, and therefore the microorganism bath, even when there is no immersion. It will be understood of course, that the two baths can be interchanged so that if desired, the nutrient bath could be directed through the dialyzing membranous tube while the microorganism bath could be introduced to the outer surface thereof.

Rotation of the drum 14 by means of the motor 32 will produce agitation of both the bath within the tube 34 and that within the tank 10 and if the tube is not completely filled with liquid, it will be advanced in the desired direction through the tube by proper rotation of the drum. Of course, the liquid flowing through the tube can be advanced by the use of differential pressures by means of a pressure head or pumping apparatus, not shown.

Any number of components such as that shown in Fig. 1 of the drawing can be connected in series by suitable couplings of conventional types to produce an optimum length of growing cycle. The rate of rotation of the drum can assume a value most consistent with the results desired and even a variable rate can be produced in order to modify the time cycle and/or the light application cycle.

The apparatus depicted in Figs. 2 and 3 contemplates the use of a plurality of cells 60, 62, 64, 66, 68 and 70 separated one from the next by means of a dialyzing membrane 72. Assuming that the microorganism bath is introduced into the cell 60 through an inlet pipe 74, it will flow through a connector 76 to the cell 64, through another connector 78 to the cell 68 from which it will be discharged through a tubular outlet 80. Similarly, the nutrient bath will be introduced in countercurrent flow into the cell 70 through an inlet tube 82, through a connector 84 to the cell 66, through a connector 86 to the cell 62 and through a discharge tube 88 for disposal or recirculation in a suitable manner. Where sewage is used as the nutrient bath, it can be processed by the conventional methods and then introduced into an apparatus of the type contemplated herein resulting not only in the utilization of its nutrient content while excluding any of its contaminants from the microorganism bath but in oxygenation of the sewage itself which is very advantageous in the preservation of marine life.

The light and dark cycles which have been found to be desirable as described in the publication of the Carnegie Institution will occur naturally where a drum is rotated in the manner described with reference to Fig. 1 since the microorganisms submerged in the tank carried bath will be obscured from the light and of course the light itself can be terminated for prescribed periods necessary to achieve the best results.

Temperature conditions can be controlled readily by applying elevated or reduced temperatures to the nutrient bath for example, or by selecting a source of water for such bath as will produce the desired temperature conditions of the microorganism bath by heat exchange principles.

A most outstanding result achieved in the culture of *Chlorella pyrenoidosa* by the use of dialysis as described herein is the greatly increased yield over previously known methods.

Where natural sunlight is employed, considerable variation will be experienced. This variation can be compensated by modifying the length of tubing through which the microorganism bath passes as by changing the number of units of the type depicted in Figs. 1 or 2 to increase or decrease the length of the path traversed.

At the discharge end of the apparatus, the bath containing the microorganisms will be withdrawn and the *Chlorella pyrenoidosa* or other end products will be separated by means of a centrifuge or other appropriate methods for use as food, animal feed and other purposes for which such end products are suitable.

Whereas the invention has been described with reference to only two specific forms of apparatus, these examples should not be construed as limiting nor should the specific aspects of the methods described be construed as limiting beyond the scope of the appended claims.

We claim:

1. A method of propagating photosynthetic microorganisms comprising exposing an aqueous bath containing microorganisms to one surface of a dialyzing membrane, exposing a nutrient bath for said microorganisms to an opposed surface of said membrane, and exposing said microorganisms to light.

2. A method as set forth in claim 1 wherein the bath containing said microorganisms is agitated.

3. A method as set forth in claim 1 wherein movement relative to said membrane is imparted to one of said baths.

4. A method as set forth in claim 1 wherein movement relative to said membrane is imparted to said microorganism containing bath.

5. A method as set forth in claim 1 wherein said microorganism containing bath is advanced along the surface of said membrane.

6. A method as set forth in claim 1 wherein said membrane is tubular and one of said baths flows therethrough.

7. A method as set forth in claim 1 wherein one of said baths is advanced along a substantially helical path.

8. A method as set forth in claim 1 wherein said microorganisms are exposed to light intermittently.

9. A method as set forth in claim 1 wherein at least one of said baths is aerated.

10. A method as set forth in claim 1 wherein carbon dioxide is introduced into at least one of said baths.

11. A method as set forth in claim 1 wherein said baths are advanced in opposite directions relative to said membrane.

12. A method as set forth in claim 1 wherein said microorganisms are algae.

13. A method as set forth in claim 1 wherein said microorganisms are Chlorella.

14. A method as set forth in claim 1 wherein said microorganisms are *Chlorella pyrenoidosa*.

15. A method as set forth in claim 1 wherein said dialyzing membrane is a light transmitting tube serving as a conductor for one of said baths.

16. A method as set forth in claim 1 wherein the diffusion of nutrients from said nutrient bath to said microorganism bath is regulated by said membrane to maintain a substantially constant concentration of nutrients in said microorganism bath.

17. A method as set forth in claim 1 wherein said microorganisms are exposed to light continuously.

18. Apparatus for the propagation of photosynthetic microorganisms comprising a dialyzing membrane in the form of a substantially helical tube having an inlet and an outlet for the passage of liquid therethrough, and a receptacle receiving at least a portion of said membrane for immersion thereof in a second liquid.

19. Apparatus as set forth in claim 18 wherein said membrane in the form of a substantially helical tube is supported on a rotatable drum.

20. Apparatus as set forth in claim 18 wherein agitation means produces relative movement between said membrane and receptacle.

(References on following page)

References Cited in the file of this patent

UNITED STATES PATENTS

| | | |
|---|---|---|
| 2,049,828 | Stevens | Aug. 4, 1936 |
| 2,140,341 | Wallach | Dec. 13, 1938 |
| 2,330,672 | Braak | Sept. 28, 1943 |
| 2,408,625 | Graham | Oct. 1, 1946 |
| 2,411,238 | Zender | Nov. 19, 1946 |
| 2,658,310 | Cook | Nov. 10, 1953 |
| 2,692,854 | Henley | Oct. 26, 1954 |

FOREIGN PATENTS

| | | |
|---|---|---|
| 886,719 | France | July 12, 1943 |
| 533,776 | Germany | Sept. 21, 1931 |
| 704,872 | Great Britain | Mar. 3, 1954 |

OTHER REFERENCES

Livingston, Plant World, vol. 11, No. 2, pp. 39–40 (February 1908).

Livingston, Plant World, vol. 11, No. 8, pp. 183–184 (August 1908).